United States Patent [19]
Ohyagi et al.

[11] Patent Number: 4,642,632
[45] Date of Patent: Feb. 10, 1987

[54] DIGITAL PAGING SYSTEM HAVING BIT RATE SWITCHING MEANS AND DIGITAL PAGING RECEIVER THEREFOR

[75] Inventors: Takashi Ohyagi; Yoshio Ichikawa, both of Tokyo, Japan

[73] Assignee: NEC Corporation, Tokyo, Japan

[21] Appl. No.: 542,820

[22] Filed: Oct. 17, 1983

[30] Foreign Application Priority Data

Oct. 15, 1982 [JP] Japan ............................ 57-155820[U]

[51] Int. Cl.$^4$ .............................................. H04Q 7/00
[52] U.S. Cl. .................................. 340/825.44; 370/84; 455/38
[58] Field of Search ...................... 340/825.44, 825.47, 340/825.04, 825.48, 825.52, 825.57, 825.62, 825.71, 311.1; 375/94, 96; 455/343, 32, 38; 370/84

[56] References Cited

U.S. PATENT DOCUMENTS

| | | | |
|---|---|---|---|
| 3,990,046 | 11/1976 | Katz et al. | 340/147 |
| 4,330,780 | 5/1982 | Masaki | 340/825.44 |
| 4,403,212 | 9/1983 | Masaki | 340/311.1 |
| 4,411,004 | 10/1983 | Graham | 370/84 |

Primary Examiner—Donald J. Yusko
Assistant Examiner—Sharon Hodgkins
Attorney, Agent, or Firm—Sughrue, Mion, Zinn, Macpeak & Seas

[57] ABSTRACT

A paging system in which an address code is transmitted at a lower transmission rate than message code and a discrimination code defines the boundary between the address and the message. The receiver includes a low pass filter with a cut-off frequency switchable between the reception rate for the address and the reception rate for the message in response to the discrimination code.

10 Claims, 20 Drawing Figures

| WORD DISG. BITS (2BITS) | NOS. OF FOLLOWING WORDS |
|---|---|
| 0 0 | 0 |
| 0 1 | 1 |
| 1 0 | 2 |
| 1 1 | 3 |

DIGITAL PAGING SYSTEM HAVING BIT RATE SWITCHING MEANS AND DIGITAL PAGING RECEIVER THEREFOR

BACKGROUND OF THE INVENTION

The present invention relates to a digital paging system, and more particularly to a digital paging system permitting both transmission and reception of a paging code including an address code and a message code.

In digital paging systems there are both higher and lower limits to the rate of transmission because of the need for efficient use of frequencies and because of the fear of a decrease in the probability of receiving the paging code due to an increase in the bit error rate (BER). Meanwhile, there are many proposals for paging systems in which message codes expressed in numerals or letters are transmitted as well as address or caling codes. In the proposed systems the paging receivers receive and display such message codes. One of the known examples of such proposals is the "Digital Radio Paging Communication System," disclosed by M. Masaki in the U.K. Patent Application Disclosure No. 2,061,582, which was assigned to the present application and made public on May 13, 1981. The transmission of message codes by such a system requires a transmission capacity twice or three times as great as that for mere address codes because each message code usually contains a large quantity of information. Therefore, the length of time during which the communication line is occupied by each subscriber tends to be extended, and inevitably the subscriber capacity of the whole system is correspondingly limited. This shortcoming could be overcome by raising the transmission rate, but it would again entail, as stated above, a decrease in paging code reception probability. Particularly, the decrease of the address code reception probability is fatal to the paging system because the paging receiver starts processing the message codes following its address code only after the latter has been correctly detected.

SUMMARY OF THE INVENTION

Therefore, an object of the present invention is to provide a paging system capable of effectively transmitting and receiving message codes without adversely affecting the paging code (especially, address code) reception probability.

Another object of the invention is to provide a paging system capable of transmitting paging codes, including sync codes and address codes, at a lower bit rate and message codes at a higher bit rate.

Still another object of the invention is to provide a paging receiver capable of receiving address or calling codes transmitted at the lower bit rate and message codes transmitted at the higher bit rate.

According to the present invention, there is provided a paging receiver comprising receiver means for receiving a paging code signal including a first coded pulse sequence having a first transmission rate and a second coded pulse sequence having a second transmission rate, the second coded pulse sequence containing a first codeword and an integer number of following codewords; low-pass filter (LPF) means connected to the output of the receiver means for switching its cut-off frequency in response to a control signal and selectively extracting the first and second codewords; and data processing section means, coupled to the output of the LPF means, for generating the control signal, supplying the control signal to the LPF means, and decoding the extracted first and second codewords.

BRIEF DESCRIPTION OF THE DRAWINGS

Other objects, features and advantages of the present invention will become more apparent from the detailed description hereunder taken in conjunction with the accompanying drawings, wherein.

DETAILED DESCRIPTION OF PREFERRED EMBODIMENT

Figure 1:
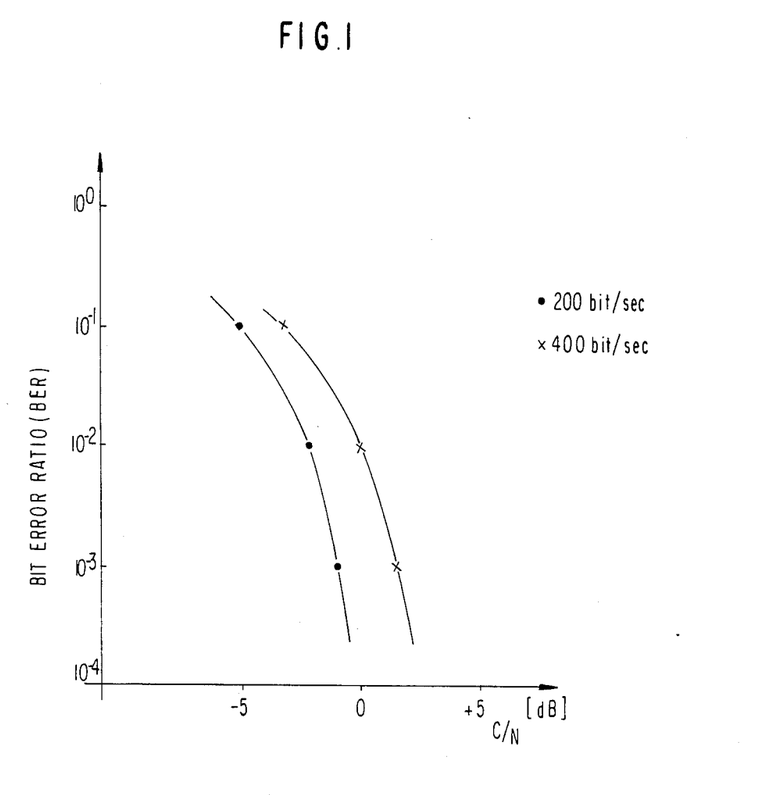
FIG. 1 shows the BER-to-C/N characteristic where the transmission rate is taken as the parameter and C/N is the carrier-to-noise ratio.

FIG. 1 shows that, as stated above, the transmission rate and the BER are inversely proportional. Thus, to obtain the same BER, a high carrier-to-noise (C/N) ratio, i.e., a greater transmission power, is needed at a transmission rate of 400 bits/sec than at one of 200 bits/sec.

Figure 2A:
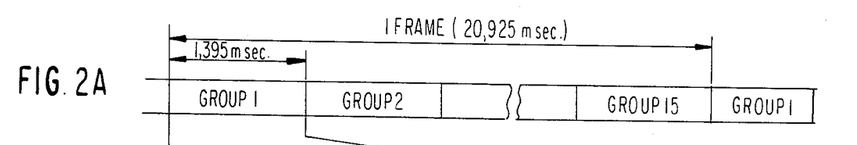
FIGS. 2A to 2F show the formats of paging signals applicable to the paging system according to the process invention.
Figure 2B:
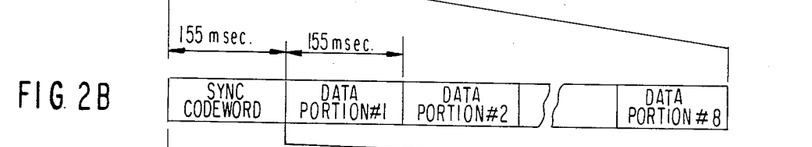
Figure 2C:
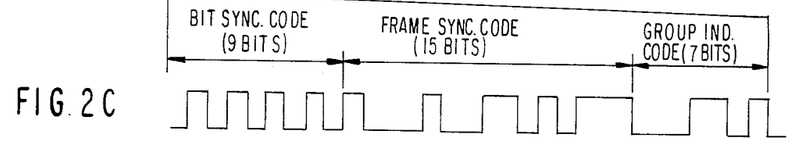
Figure 2D:
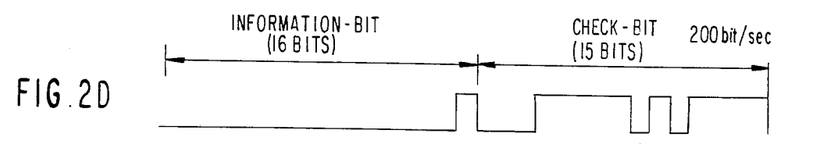
Figure 2E:
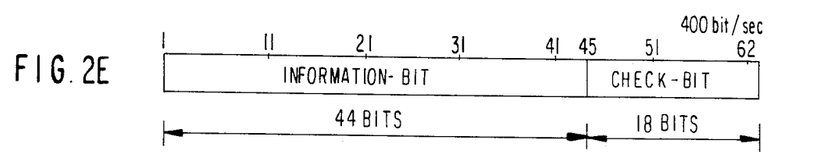
Figure 2F:
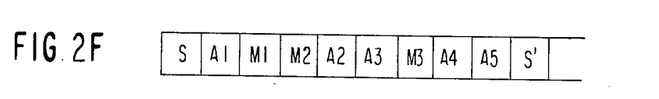

FIG. 2A shows how groups of paging codes are put together. Each receiver is assigned to one or another of these groups. FIG. 2B shows how each group is composed of different codes, and FIG. 2C illustrates the composition of a sync code for achieving word synchronization and group synchronization. In FIG. 2B, data portions #1–#8 contain either an address or a message code. FIG. 2D shows the structure of an address or calling code for selectively calling each receiver, where a Bose-Chandhuri-Hocguenghem or BCH (31, 16) code is used. The bit rate of the address code is 200 bits/sec in this instance. FIG. 2E illustrates the composition of a message code, for which the bit rate has been doubled, over that for the address code, to a BCH (62, 44) code. The BCH (62, 44) code is one bit shorter than an ordinary BCH (63, 45) code because the length of the message code has to be equal to that of the address code due to the frame synchronization. The BCH (62, 44) code can be used as the BCH (63, 45) code or have the same syndrome as the BCH (63, 45) code by regarding one information bit of the BCH (63, 45) code as a fixed logical level, "1" or "0". FIG. 2F shows an example of the composition of transmitted paging codes, wherein S and S' are sync codes; A1 to A5 are address codes for selectively calling individual receivers, and M1 to M3 are message codes for which alone the transmission rate is raised to 400 bits/sec.

Figure 3:
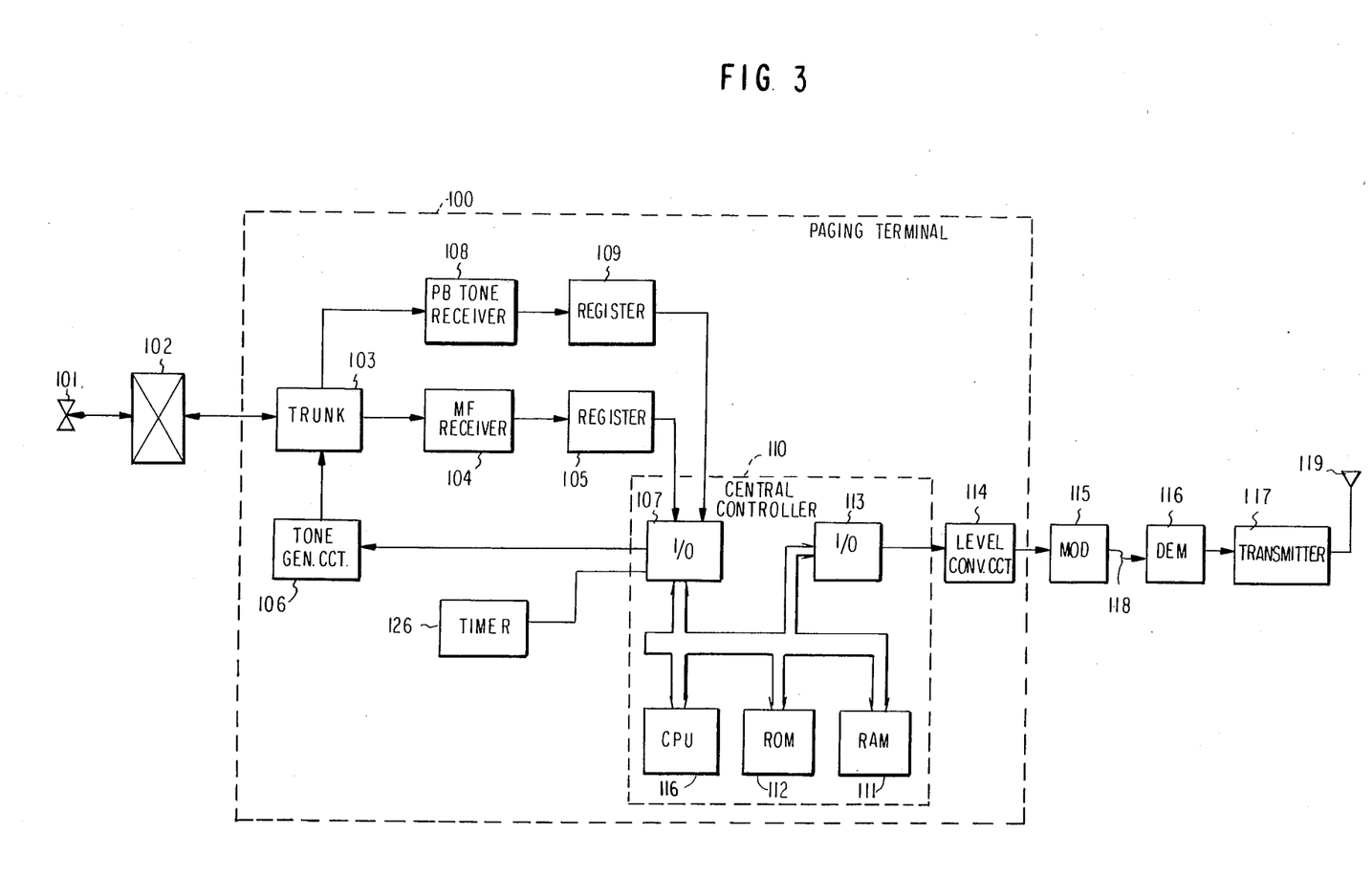
FIG. 3 is a block diagram illustrating the structure of a paging terminal station of the paging system according to the present invention.

Referring to FIG. 3, each element of a paging terminal 100 will be briefly described below. The paging terminal 100 is connected to a common telephone exchange network 102 including a telephone set 101 of the pushbutton or same other type. A multi-frequency (MF) receiver 104 receives MF signals sent over a trunk 103, and supplies them to a register 105. Similarly, a pushbutton (PB) receiver 108 receives PB tones sent over the trunk 103, and supplies them to a register 109. A tone generating circuit 106 is used for sending both valid and invalid tones from the paging terminal 100 to the telephone set 101 or the like. A timer 126 is intended for providing an input/output (I/O) port 107 with I/O timing, and a level converter circuit 114 converts the level of codes supplied from a controller 110 as to be suitable for a modulator 115. The controller 110 operates under the control of a CPU 114b using a ROM 112. A transmitter 117 transmits at radio frequency through an antenna 119 paging signals transmitted from the modulator 115 through a transmission line 118 and demodulated by a demodulator 116. For further details on this paging terminal, reference is made to the aforementioned disclosure of Masaki's patent.

Figure 4:
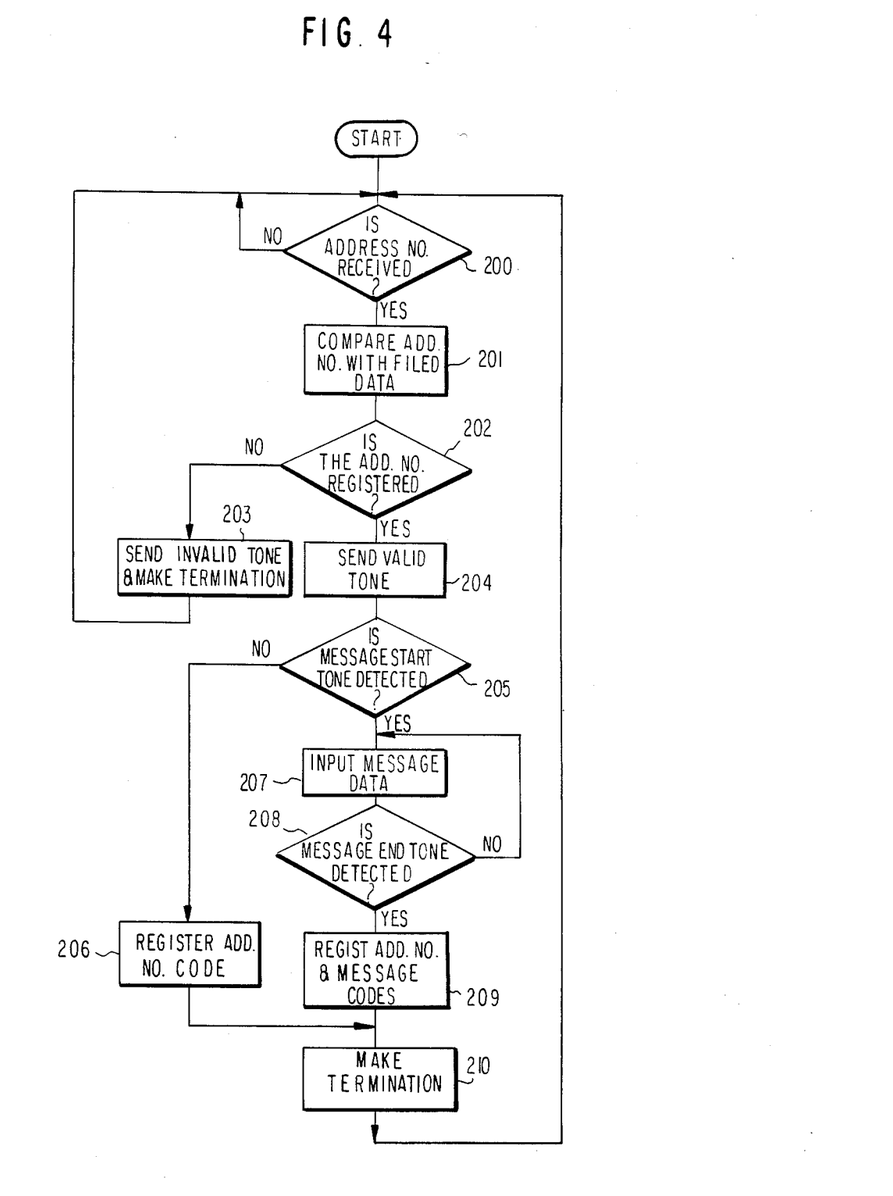
FIG. 4 shows the control flow in the controller section referred to in FIG. 3.

Now referring to FIG. 4, it will be described how the controller 110, referred to in FIG. 3, takes in an address number and message data from the common telephone network. The controller 110 waits until an address number is entered into the register 105 (see Step 200 in FIG. 4). Upon entry of the address number at Step 200, the controller 110 advances to Step 201 to take data in from the register 105 through the I/O port 107, and compares it with subscribers' file data stored in a random-access memory (RAM) 111. As illustrated in Step 202, the operational flow then follows either one of two branches, depending on the result of comparison. If the address number is found not registered in the subscribers' file, the flow will go on to Step 203 or, if it is registered, to Step 204. At Step 203, an invalid tone is generated from the tone generator circuit 106 and, at the same time, a termination procedure is undertaken by returning to Step 200, which is a waiting action.

At Step 204, the controller 110 sends out a valid tone, in response to which the exchange network 102 directly connects the paging terminal 100 to the telephone set 101. In such a direct connection, the paging terminal 100 can receiver PB tones from the telephone set 101 with the PB tone receiver 108. Next, controller 110 proceeds to Step 205, where it waits for the entry of the input start tone of message data. The input start tone is entered with, e.g., the # mark key of the PB telephone set 101. If the start tone fails to be entered within a prescribed length of time, the flow moves on to Step 206, where an address code is prepared for performing the so-called tone-only paging service and the code so prepared is registered in the send-out code area of the RAM 111. Each digit of address number is changed to 4-bit binary code, so that the address number can be transmitted by 4 digits per one data portion, as shown in FIG. 2D.

On the other hand, if the input start tone of message data is received, the controller 110 goes on to Step 207 to take in message data. A decision is made at Step 208 as to whether or not a message-end tone is contained in the data taken in at Step 207, and Step 207 is repeated until this end tone is detected, eventually to fully receive the whole message. The end tone is, similar to the start tone, entered with the * mark key of the telephone set 101. Upon detection of the message-end tone at Step 208, the flow proceeds to Step 209 to prepare an address code and a message code from the received address number and message, respectively. Since each digit of message data is encoded to a 4-bit binary code and the data portion used for the message has 44 bits in the information-bit area, as shown in FIG. 2E, 11 message digits can be transmitted per data portion. However, the first 4 bits (4 MSB bits) of the data portion are used for transmitting discrimination (DS) bits and word designation bits, as will be described later. Thus, 10 message digits can be conveyed per one data portion. The DS bits distinguish between the address and the message codes. The word designation bits indicate the number of following message codes (see FIG. 9). The encoded message is registered together with the DS bits in the send-out code area of RAM 111 under control of the controller 110. One DS bit is used in the address number and two DS bits in the message. Upon completion of the registration, the controller 110 goes to Step 210 to undertake the termination procedure, and then returns to Step 200.

Figure 5A:
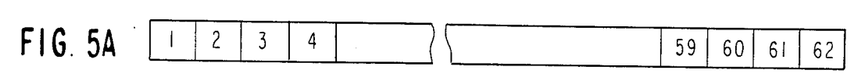
FIGS. 5A to 5C illustrate the registration forms of paging codes at the paging terminal of FIG. 3, with FIG. 5A showing the composition of each code word, FIG. 5B the state in which a message is registered and FIG. 5C that in which an address number is registered.
Figure 5B:
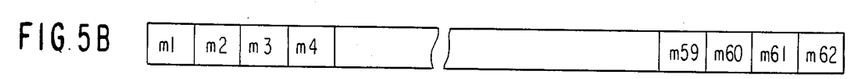

Next will be described the form of code registration at Step 206 or 209 of FIG. 4 with reference to FIGS. 5A to 5C. Each word or code word for registration which corresponds to the data portion of FIG. 2B, consists of 62 bits as illustrated in FIG. 5A. Message code bits are registered, as shown in FIG. 5B, in a one-to-one correspondence with the bits of the code word, so that 62 bits of information are registered per code word. On the other hand, address code bits are registered, as shown in FIG. 5C, in a ratio of one to every two bits of the code word, so that only 31 address code bits are registered per code word.

Figure 5C:
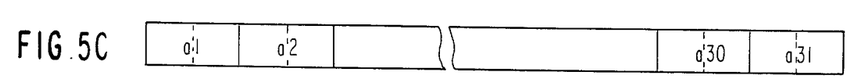

Both address and message codes which have been registered in the send-out code area of RAM 111 in the forms shown in FIGS. 5B and 5C are sent out of the RAM 111 at the transmission rate of the message code (at 400 bits/sec in this particular instance). Because each bit of the address code, a1, a2, . . . a30, a31 respectively corresponds to two bits of message code, m1 and m2, m3 and m4, . . . m59 and m60 and m61 and m62, as shown in FIGS. 5B AND 5C, a carrier wave which is frequency modulated with the address code looks as if it has half the transmission rate of the message code, or 200 bits/sec. Indeed, when the carrier wave is demodulated, the transmission rate of the demodulated baseband signal will become 200 bits/sec.

Figure 6:
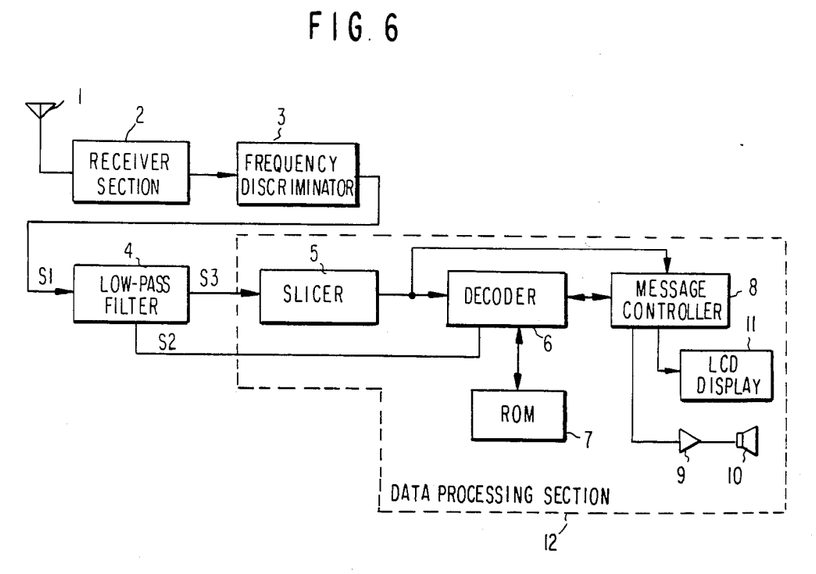
FIG. 6 is a block diagram of a paging receiver of the paging system according to the present invention.

In FIG. 6, the paging receiver includes an antenna 1, an r.f. receiver section 2, a frequency discriminator 3, a low-pass filter (LPF) 4 capable of selecting its cut-off frequency, and a data processing section 12. The data processing section further comprises a waveform shaping circuit 5, a decoder 6, a read-only memory (ROM) 7 for storing address codes, a message controller 8, a speaker driving buffer 9, a speaker 10 and a liquid crystal display device (LCD) 11.

A radio frequency carrier wave frequency-modulated by paging codes and transmitted from the transmitting side in FIG. 3 is picked up by the antenna 1, and amplified and frequency-converted by the receiver section 2, whose output is demodulated by the frequency discriminator 3 into a baseband signal. After being extracted by the LPF 4, the baseband signal is waveform-shaped by the slicer 5 and supplied to the decoder 6 as a digital signal. The decoder 6 decodes the output of the slicer 5 and, upon detection of the sync code illustrated in FIG. 2C, achieves frame synchronization and group synchronization.

After that, an address number code assigned to the receiver is read out of the ROM 7, and compared with the received address code. If the received address code is found identical with the address code read out of the ROM 7, the decoder 6 provides a control signal S2 to switch the cut-off frequency of the LPF 4, thereby to make possible data reception at a rate of 400 bit/sec and, at the same time, the message controller 8 is actuated. The message controller 8 receives and decodes message codes, and alerts the subscriber by either emitting an alert tone from the speaker 10 through the buffer 9 or displaying the decoded message codes on the LCD 11.

Figure 7A:
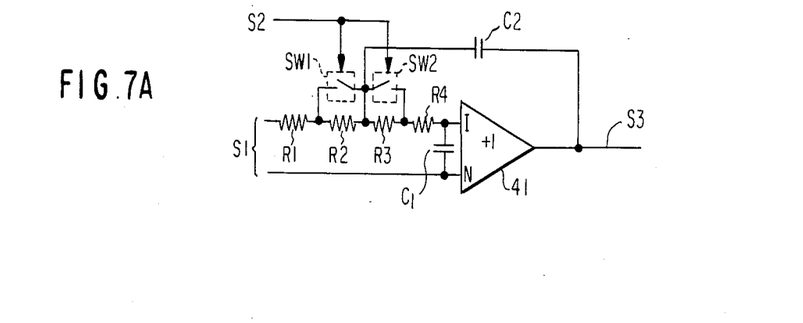
FIGS. 7A and 7B respectively are a schematic circuit diagram and a frequency characteristic diagram of the LPF of the receiver referred to in FIG. 6.

FIG. 7A illustrates the circuitry of the LPF 4 referred to in FIG. 6, which is a secondary Butterworth LPF using an operational amplifier 41. In the figure, switching circuits SW1 and SW2 are operated by the control signal S2, while resistors R1 through R4 and capacitors C1 and C2 are for determining the cut-off frequency. The cut-off frequency used when the switching circuits SW1 and SW2 are open being represented by $f_{C1}$, and that used when the two switching circuits are closed being represented by $f_{C2}$, the two cut-off frequencies will be given by the following equations, respectively:

$$f_{C1} = 1/2\pi(R1+R2)C1$$

$$f_{C2} = 1/2\pi R1C1$$

provided that R1=R4, R2=R3, and C1=C2.

Figure 7B:
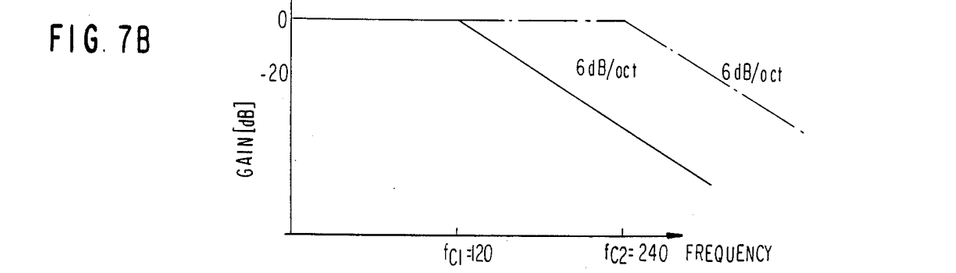

These cut-off frequencies $f_{C1}$ and $f_{C2}$ are those used when signals are received at transmission rates of 200 bits/sec and 400 bits/sec, respectively. At the cut-off frequency $f_{C1}$ (120 Hz), the LPF 4 extracts an address code from the output S1 of the discriminator 3, as an output S3. At $f_{C2}$ (240 Hz), the LPF 4 also extracts a message code from the output S1, as an output signal S3. The resultant S3 is applied to the slicer 5. FIG. 7B shows the frequency characteristic of the LPF 4 illustrated in FIG. 7A.

The LPF permitting the selection of its cut-off frequency, referred to above, may consist of some other kind of filter as well, such as a switched capacitor filter (SCF) or a digital filter. Also, the LPF may comprise two LPF's whose cut-off frequencies differ from each other.

Thus by switching the cut-off frequency of the LPF, signals transmitted at a low transmission rate can be received with an LPF having the optimal cut-off frequency, and noise can be thereby eliminated. As can be seen from FIG. 7B, when the transmission rate is 200 bit/sec, the level of output noise from the LPF can be 3 dB lower than when the rate is 400 bits/sec, resulting in a corresponding improvement in code reception probability.

Figure 8A:
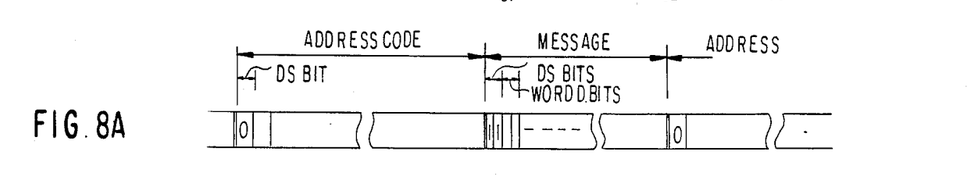
FIGS. 8A to 8D are time charts illustrating the operation of the paging receiver illustrated in FIG. 6 to detect a paging signal.
Figures 8B, 8C, 8D:
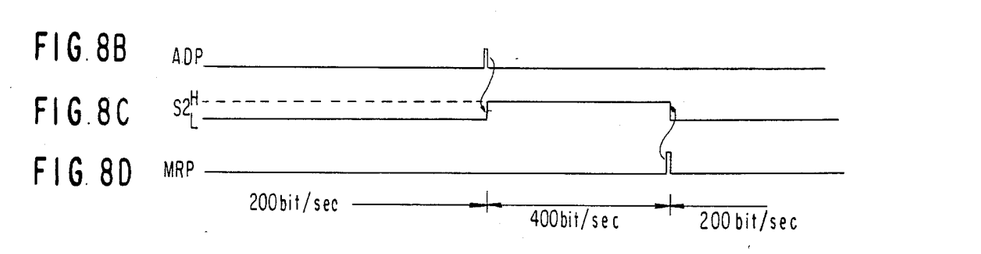

FIGS. 8A through 8D illustrate an example of the operation of the paging receiver of FIG. 6 according to the resent invention when it receives the codes shown in FIGS. 2A through 2F. The decoder 6, until it receives the address code, keeps the control signal S2 at the "L" level as shown in FIG. 8C to receive signals at the transmission rate of 200 bits/sec. Upon receipt of the address code for the receiver, the decoder 6 sends an address detection pulse (ADP) to the message controller 8 at the end of the address code, as shown in FIG. 8B. At the same time, it raises the control signal S2 to the "H" level as shown in FIG. 8C to switch the cut-off frequency of the LPF 4 to what corresponds to the transmission rate of 400 bits/sec, and thereby pass the following codes.

Figure 9:
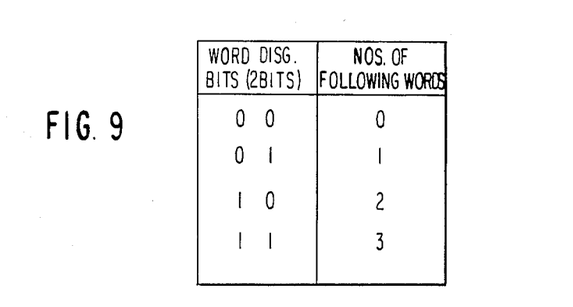
FIG. 9 is a chart showing the word number designating bits, together with the functions thereof, of paging signals to be used by the paging system according to the present invention.

The message controller 8 is actuated by the ADP pulse, and receives and stores demodulated baseband signals from the slicer 5. Upon receipt of a word of message code, the message controller 8 determines, according to the first two bits of the word, whether or not the received word is a message code and, if it is, according to the word designating information of the next two bits, whether or not the word will be followed by another message, code. If no message code follows the message in question, the message controller 8 supplies a message reception end pulse (MRP) to the decoder 6 at the time the message code is completed, as shown in FIG. 8A and 8D. The relationship between word designation information bits and the number of following message words is shown in FIG. 9. In response to the MRP pulse, the decoder 6 changes the control signal S2 to the "L" level (FIG. 8C), returns the LPF 4 to the cut-off frequency corresponding to signals transmitted at the rate of 200 bits/sec, and resumes the reception of address code.

FIG. 8A shows an instance in which the DS bit of the address code is "0" and the DS bits of the message code are "11". In addition, two bits following the two MSBs of the message code indicate the number of following message words as stated above and are termed the word designation bits. FIG. 9 shows the relationship between the word designation bits and the number of following message words. It is possible to judge according to this information whether or not the next code word is a message code so that the cut-off frequency of the LPF can be controlled accordingly.

In another conceivable code composition, information regarding the transmission rate of every next signal, 200 or 400 bits/sec, is incorporated into the sync code shown in FIG. 2C. This composition makes it possible to eliminate the message discrimination code and word number designation code, both referred to above, and thereby to utilize codes more efficiently.

As hitherto described, the present invention enables address codes to be composed at a lower bit rate and message codes, at a higher bit rate. Therefore, the invention can provide a paging receiver which contributes to curbing the decrease of subscriber capacity and to efficiently transmitting message information without adversely affecting the calling code reception probability.

What is claimed is:

1. A paging receiver comprising:
   receiving means for receiving a carrier wave which is modulated with a paging signal including first coded pulse sequences of a first transmission rate and second coded pulse sequences of a second transmission rate, said first and second transmission rates differing from each other, said first and second coded pulse sequences including first and second predetermined bits, respectively, said second pulse sequences bring comprised of a first codeword and n codewords following said first codeword, n being zero or a positive integer, said second pulse sequence further including third predetermined bits which follow said second predetermined bits and represent the number of said n codewords;

demodulating means for demodulating the received carrier wave;

low-pass filter means coupled to the output of said demodulating means for switching the first cut-off frequency thereof to the second one to pass said second coded pulse sequences when said first means receives a first control signal and switching said second cut-off frequency to said first one to pass said first coded pulse sequences when said filter means receives a second control signal; and data processing section means coupled to the output of said low-pass filter means for generating said first control signal at the end of said first coded pulse sequences when said first coded pulse sequences coincide with a third coded pulse sequence unique to said paging receiver, generating said second control signal at the end of said second coded pulse sequences in response to the reception of said second predetermined bits and in accordance with the content of said third predetermined bits, and decoding the passed first and second coded pulse sequences.

2. A receiver, as claimed in claim 1, wherein said first coded pulse sequences represent an address number, said second coded pulse sequences represent a message, said second transmission rate is higher than said first transmission rate, and said third coded pulse sequences represent an address number assigned to said paging receiver.

3. A paging receiver, as claimed in claim 2, wherein said data processing section comprises: means for waveform-shaping the output of said low-pass filter means; a decoder, coupled to the output of said waveform shaping means and receiving said first predetermined bit, for comparing said address number represented by said first coded pulse sequences and said address number assigned to said receiver and, if the two address numbers are found identical, generating said first control signal at the end of said first coded pulse sequences and, sending out an alert signal; and a message control activated by said first control signal and receiving said second and third predetermined bits for generating said second control signal at the end of said second coded pulse sequences upon recept of said second and third predetermined bits, accepting messages from said waveform-shaping means and displaying them on a display device.

4. A paging receiver, as claimed in claim 1, wherein said first predetermined bit is inserted into the most significant bit of said first coded pulse sequences and said second and third predetermined bits are inserted into the most significant bits of said second coded pulse sequences.

5. A receiver, as claimed in claim 1, wherein said low-pass filter means is a Butterworth filter and includes:

an operational amplifier coupled to an output terminal and to the input of said low-pass filter means and having inverting and non-inverting input terminals;

a plurality of resistors connected in series between the input of said low-pass filter means and said inverting input terminal;

a first capacitor connected between said inverting and non-inverting input terminals;

a second capacitor connected between said output terminal and one of said pulurality of resistors; and a switching element for short-circuiting any desired one of said plurality of resistors in accordance with said first and second control signal.

6. A method for receiving a paging signal at a paging receiver, comprising the steps of:

receiving a carrier wave which is modulated with said paging signal including first coded pulse sequences of a first transmission rate and second coded pulse sequences of a second transmission rate, said first and second transmission rates differing from each other, said first and second coded pulse sequences including first and second predetermined bits, respectively, said second pulse sequences being comprised of a first codeword and n codewords following said first codeword, n being zero or a positive integer, said second pulse sequences further including third predetermined bits which follow said second predetermined bits and represent the number of said n codewords;

demodulating the received carrier wave to provide demodulated first and second coded pulse sequences;

receiving first and second control signals, selectively passing said demodulated first and second coded pulse sequences by switching the cut-off frequency of a low-pass filter included in said paging receiver dependent upon receiving said first and second control signals;

generating said first control signal when said first coded pulse sequences coincide with third coded pulse sequences unique to said paging receiver;

generating said second control signal in response to the reception of said second predetermined bits and in accordance with the content of said third predetermined bits; and decoding said demodulated first and second coded pulse sequences which have been passed.

7. A method, as claimed in claim 6, wherein said first coded pulse sequences represent an address number, said second coded pulse sequences represent a message to said second transmission rate is higher than said first transmission rate, said third coded pulse sequences represent an address number assigned to said paging receiver.

8. A method, as claimed in claim 6, wherein said first predetermined bit is inserted into the most significant bit of said first coded pulse sequences code and said second and third predetermined bits are inserted into the most significant bits of said second coded pulse sequences.

9. A paging method comprising the steps of:

modulating a carrier wave with a paging signal including first coded pulse sequences of a first transmission rate and second coded pulse sequences of a second transmission rate, said first and second transmission rates differing from each other, said first and second coded pulse sequences including first and second predetermined bits, respectively, said second pulse sequences being comprised of a first codeword and n codewords following said first codeword, n being zero or a positive integer, said second pulse sequences further including third predetermined bits which follow said second predetermined bits and represent the number of said n codewords;

transmitting the modulated carrier wave to a paging receiver;

receiver and demodulating the transmitted, modulated carrier wave to provide demodulated first and second coded pulse sequences;

selectively passing said demodulated first and second code pulse sequences by switching the cut-off frequency of a low-pass filter included in said paging receiver in accordance with the demodulated first, second and third predetermined bits; and decoding said demodulated first and second coded pulse sequences which have been passed.

10. A method, as claimed in claim 9, wherein said first coded pulse sequences represent an address number, said second coded pulse sequences represent a message and said second transmission rate is higher than said first transmission rate.

* * * * *

UNITED STATES PATENT AND TRADEMARK OFFICE
CERTIFICATE OF CORRECTION

PATENT NO. : 4,642,632

DATED : February 10, 1987

INVENTOR(S) : TAKASHI OHYAGI and YOSHIO ICHIKAWA

It is certified that error appears in the above-identified patent and that said Letters Patent is hereby corrected as shown below:

Column 1, line 19, delete "caling" insert --calling--.

Column 4, line 47, delete "AND" insert --and--.

Column 6, line 14, after "message" delete ",".

Column 6, line 64, delete "bring" insert --being--.

Signed and Sealed this

First Day of December, 1987

Attest:

DONALD J. QUIGG

*Attesting Officer*  *Commissioner of Patents and Trademarks*